US 8,849,199 B2

(12) United States Patent
Shrum, Jr. et al.

(10) Patent No.: US 8,849,199 B2
(45) Date of Patent: Sep. 30, 2014

(54) SYSTEMS AND METHODS FOR CUSTOMIZING BROADBAND CONTENT BASED UPON PASSIVE PRESENCE DETECTION OF USERS

(75) Inventors: Edgar V. Shrum, Jr., Smyrna, GA (US);
John Civiletto, Suwanee, GA (US)

(73) Assignee: Cox Communications, Inc., Atlanta, GA (US)

( * ) Notice: Subject to any disclaimer, the term of this patent is extended or adjusted under 35 U.S.C. 154(b) by 115 days.

(21) Appl. No.: 12/956,718

(22) Filed: Nov. 30, 2010

(65) Prior Publication Data

US 2012/0135684 A1 May 31, 2012

(51) Int. Cl.
*H04B 7/00* (2006.01)
*H04N 21/4415* (2011.01)
*H04N 21/258* (2011.01)
*H04N 21/262* (2011.01)
*H04N 21/422* (2011.01)
*H04N 21/442* (2011.01)

(52) U.S. Cl.
CPC ..... *H04N 21/4415* (2013.01); *H04N 21/25808* (2013.01); *H04N 21/26208* (2013.01); *H04N 21/25866* (2013.01); *H04N 21/42203* (2013.01); *H04N 21/44218* (2013.01)
USPC .............. 455/41.2; 725/10; 704/231

(58) Field of Classification Search
None
See application file for complete search history.

(56) References Cited

U.S. PATENT DOCUMENTS

| 5,895,447 | A | 4/1999 | Ittcheriah et al. |
| 6,029,124 | A | 2/2000 | Gillick et al. |
| 6,446,039 | B1 | 9/2002 | Miyazawa et al. |
| 8,265,341 | B2 | 9/2012 | Dernis et al. |
| 2002/0095295 | A1 | 7/2002 | Cohen et al. |
| 2006/0200344 | A1 | 9/2006 | Kosek et al. |
| 2006/0203105 | A1 | 9/2006 | Srinivasan |
| 2007/0021959 | A1 | 1/2007 | Goto |
| 2007/0078542 | A1 | 4/2007 | Alderson |
| 2007/0143777 | A1 | 6/2007 | Wang |
| 2007/0271518 | A1* | 11/2007 | Tischer et al. ............... 715/744 |
| 2007/0271580 | A1* | 11/2007 | Tischer et al. ............... 725/35 |
| 2008/0052082 | A1 | 2/2008 | Tsai et al. |
| 2008/0071535 | A1* | 3/2008 | Yoshioka et al. ............ 704/246 |
| 2008/0091434 | A1 | 4/2008 | Rodriguez et al. |
| 2008/0120105 | A1* | 5/2008 | Srinivasan ................... 704/246 |
| 2009/0217324 | A1* | 8/2009 | Massimi ....................... 725/46 |
| 2009/0253393 | A1* | 10/2009 | Dorsey et al. ............. 455/161.3 |
| 2009/0299752 | A1 | 12/2009 | Rodriguez et al. |
| 2010/0040249 | A1 | 2/2010 | Lenhardt |
| 2010/0071003 | A1* | 3/2010 | Bychkov et al. ............... 725/46 |
| 2010/0153983 | A1* | 6/2010 | Philmon et al. ................ 725/13 |
| 2011/0176690 | A1* | 7/2011 | Takano et al. .................. 381/92 |
| 2011/0182481 | A1 | 7/2011 | Dernis et al. |
| 2011/0321073 | A1* | 12/2011 | Yarvis et al. ................... 725/10 |
| 2012/0060176 | A1* | 3/2012 | Chai et al. ...................... 725/10 |

OTHER PUBLICATIONS

Non-Final Office Action for U.S. Appl. No. 12/956,651 mailed Feb. 5, 2013.

* cited by examiner

*Primary Examiner* — Nay A Maung
*Assistant Examiner* — Alejandro Rivero
(74) *Attorney, Agent, or Firm* — Sutherland Asbill & Brennan LLP

(57) ABSTRACT

Systems and methods for customizing broadband content based upon passive presence detection of users are provided. A user device in proximity to a customer premise device may be detected. The customer premise device may be configured to output programming content received from a service provider. An identifier of the detected user device may be determined. Based at least in part on the identifier, an identity of a user may be determined. Based at least in part on the identity of the user, content that is output by the customer premise device may be customized.

16 Claims, 6 Drawing Sheets

SYSTEMS AND METHODS FOR CUSTOMIZING BROADBAND CONTENT BASED UPON PASSIVE PRESENCE DETECTION OF USERS

CROSS-REFERENCE TO RELATED APPLICATION

The present application is related to U.S. patent application Ser. No. 12/956,651, filed Nov. 30, 2010, and entitled "Systems and Methods for Customizing Broadband Content Based Upon Passive Presence Detection of Users," the contents of which is incorporated by reference herein in its entirety.

FIELD OF THE INVENTION

Aspects of the invention relate generally to the provision of broadband content and services, and more particularly, to the customization of broadband content based upon passive presence detection of users.

BACKGROUND OF THE INVENTION

A wide variety of service providers, such as cable providers and satellite providers, provide entertainment services to customers, including television services, on demand programming services, pay-per-view services, and other entertainment and/or informational services. Typically, a wide variety of programming options and other information are available to customers. Given the numerous options, a customer may find it difficult to review available content and select desired programming or other desired services. Accordingly, improved systems and methods for facilitating the customization of broadband content are desirable. More specifically, systems and methods that facilitate the customization of broadband content based upon passive presence detection of users are desirable.

BRIEF DESCRIPTION OF THE INVENTION

Some or all of the above needs and/or problems may be addressed by certain embodiments of the invention. Embodiments of the invention may include systems and methods for customizing broadband content based upon passive presence detection of users. In one embodiment, a system that facilitates the customization of broadband content may be provided. The system may include at least one communications interface and at least one processor associated with a customer premise device. The at least one communications interface may be configured to detect a user device in proximity to the customer premise device. The at least one processor may be configured to (i) receive, from the at least one communications interface, an identifier of the detected user device, (ii) determine, based at least in part on the received identifier, an identity of a user, and (iii) customize, based at least in part on the identity of the user, content that is output by the customer premise device.

In accordance with another embodiment of the invention, a method for customizing broadband content may be provided. A user device in proximity to a customer premise device configured to output programming content received from a service provider may be detected. An identifier of the detected user device may be determined. Based at least in part on the identifier, an identity of a user may be determined. Based at least in part on the identity of the user, content that is output by the customer premise device may be customized.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Figure 1:
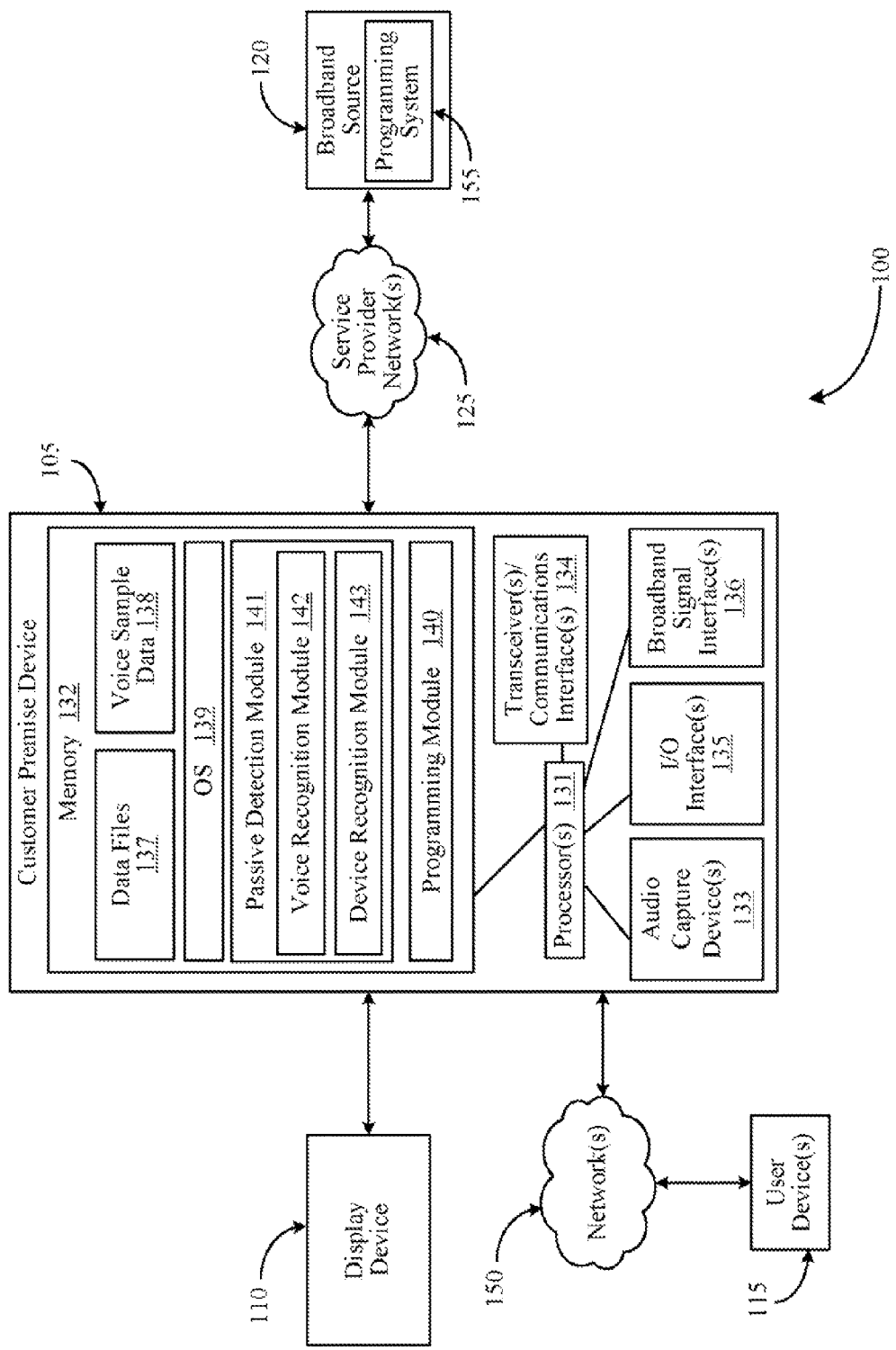
FIG. 1 illustrates a block diagram of an example system that may be utilized to facilitate the customization of broadband content, according to an illustrative embodiment of the invention.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems and methods for facilitating the customization of broadband content based upon passive presence detection of one or more users. Passive presence detection may involve the detection of one or more users by a customer premise device (e.g., a set-top box, a computer, etc.) without the users actively interacting with the customer premise device or providing the customer premise with commands that facilitate user identification.

In certain embodiments, a customer premise device, such as a cable or satellite set-top box, may identify one or more users via passive presence detection. The customer premise device may be a device configured to output content received from a service provider, such as broadband content. A wide variety of suitable methods and/or combinations of methods may be utilized as desired to identify one or more users. As one example, an audio capture device, such as a microphone embedded into and/or otherwise associated with the customer premise device, may be utilized to collect a sample of ambient audio. For example, audio samples may be periodically collected by the customer premise device in accordance with a predetermined time interval (e.g., once every five minutes, once every ten minutes, etc.). Once an audio sample is collected, one or more audio components associated with an output of the customer premise device (e.g., television audio, etc.) may be programmatically removed from the collected sample. The remaining audio portion may then be compared to one or more stored voice samples, such as user voice samples that were previously collected and stored by the customer premise device. Based upon the comparison, one or more registered users of the customer premise device may be passively detected and identified. Additionally or alternatively, one or more unregistered users may be detected. As desired, one or more characteristics of unregistered users may be determined utilizing generic voice samples. For example, generic voice sample data may be utilized to identify a gender and/or a likely age range associated with an identified unregistered user.

As another example of identifying users, the customer premise device may include or be associated with one or more communications interfaces configured to detect user devices in proximity to the customer premise device. A wide variety of different types of communications interfaces may be utilized as desired in various embodiments, such as a BLUETOOTH interface, a radio frequency interface, a WI-FI interface, a femtocell, etc. Via the communications interfaces, one or more user devices (e.g., mobile devices, etc.) may be identified, and users associated with the user devices may be determined. In this regard, users of the customer premise device may be passively detected.

Once one or more registered and/or unregistered users have been identified, the content output by the customer premise device may be customized based at least in part upon the user identities and/or determined user parameters. In certain embodiments, a single user may be identified, and content may be customized for the identified user. For example, television and movie content may be suggested based upon an identity of the user. In other embodiments, a plurality of registered users may be identified, and content may be customized based upon the identification of the plurality of users. For example, a plurality of family members may be identified, and a family movie may be suggested. In yet other embodiments, at least one registered user and at least one unregistered user may be identified. Content may then be suggested based upon the identification of both registered and unregistered users. As yet another example, one or more likely characteristics or parameters associated with unregistered users, such as a user age and/or user gender, may be determined. Content may then be suggested based upon the determinations. As desired, content may be suggested based upon any number of user profiles and/or user preferences.

A wide variety of different types of customized content may be determined by and/or output by the customer premise device. Examples of customized content include, but are not limited to, a presentation associated with personalized channels for one or more users, television and/or movie recommendations, a targeted advertisement, a recommendation of on demand content, a presentation associated with social networking accounts for the one or more users, etc. Additionally, in certain embodiments, the customer premise device may communicate a request for programming content and/or customized programming content to a service provider, such as a cable service provider or satellite service provider. The request may include identifying information for any number of identified users. In response to a request, the service provider may determine customized content and communicate customized content information to the customer premise device.

System Overview

An example system 100 for facilitating the customization of broadband content and/or broadband services will now be described illustratively with respect to FIG. 1. The system 100 may include, for example, a customer premise device 105, a display device 110, any number of user devices 115, and/or a broadband source 120. Any number of networks may facilitate communications between various components of the system 100. Additionally, as desired, one or more components of the system 100 may be processor-driven components or devices. In certain embodiments, certain components of the system 100 may be combined. For example, a customer premise device 105 may be incorporated into a display device 110.

With reference to FIG. 1, a customer premise device 105 may be a suitable device that facilitates the receipt, processing, and/or output of a broadband signal, such as a broadband cable signal or a broadband satellite signal. Additionally, the customer premise device 105 may facilitate the identification of one or more users of the customer premise device 105, and the customization of programming content based at least in part upon the identification. For example, the customer premise device 105 may identify and/or detect one or more users based upon audio or voice recognition and/or recognition of one or more user devices 115. Once one or more users have been detected and/or identified, the customer premise device 105 may facilitate the customization of programming content. One example of a suitable customer premise device is a programming processing component and/or software module that is capable of receiving and processing a broadband signal (e.g., a cable signal, satellite signal, etc.) output by a broadband source 120, such as a cable service provider or satellite service provider. Examples of suitable customer devices include, but are not limited to, a set-top box ("STB") (e.g., a cable STB, a digital satellite STB, an Internet Protocol Television STB, etc.), a virtual STB, an embedded STB, etc.

In certain embodiments, the customer premise device 105 may be connected to a display device 110, such as a television, associated with a customer. In other embodiments, the customer premise device 105 may be embedded, incorporated into, and/or executed on the display device 110. In operation, the customer premise device 105 may receive at least a portion of a broadband data signal that is output by a broadband source 120 (e.g., service provider) and convert at least a portion of the received signal into content which is displayed or otherwise output by the display device 110. As desired, the customer premise device 105 may receive a broadband data signal via any number of suitable service provider networks 125, such as a cable network that includes any number of optical fibers, coaxial cables, and/or cable drops, a satellite network that includes a suitable satellite dish and/or connecting cables, and/or other suitable networks. Additionally, any number of intermediary devices, such as broadband modems, routers, etc., may be situated between the broadband source 120 and the customer premise device 105.

As desired, the broadband signal provided to the customer premise device 105 may include a wide variety of data components, including but not limited to, a television signal, a digital television signal, data associated with a VoIP telephone service, data associated with Internet service, data associated with home monitoring services, etc. The customer premise device 105 may receive and process the broadband signal. As desired, the customer premise device 105 may selectively output a portion of the broadband signal, such as digital television data (e.g., audio and/or video data), electronic program guide data, various Web pages, etc., to the display device 110 for display. Any number of suitable connections and/or connecting devices, such as coaxial cables, High-Definition Multimedia Interface ("HDMI") cables, etc., may be utilized to connect the customer premise device 105 to the display device 110. Additionally, in certain embodiments, the customer premise device 105 may output audio data to any number of audio components, such as a home theater system, stereo system, etc.

The customer premise device 105 may be a suitable processor-driven device that facilitates the receipt, processing, and/or output of a broadband signal. Additionally, the customer premise device 105 may be a suitable processor-driven device that facilitates the passive identification of one or more users and the customization of programming content based at least in part upon the identification. As such, the customer premise device 105 may include any number of computing devices, such as a personal computer, a digital assistant, a personal digital assistant, a digital tablet, an Internet appliance, an application-specific circuit, a microcontroller, a minicomputer, or any other processor-based device. The execution of suitable computer-implemented instructions or computer-executable instructions by the customer premise device 105 may form a special purpose computer or other particular machine that is operable to facilitate the identification of users and/or the customization of broadband content output for consumption by the users.

With reference to FIG. 1, the customer premise device may include one or more processors 131, one or more memory devices 132, one or more audio capture devices 133, one or more transceivers and/or communications interfaces 134, one or more input/output ("I/O") interfaces 135, and/or one or more broadband signal interfaces 136. The processor(s) 131 may be configured to execute any number of software applications and/or computer-readable or computer-executable instructions. The memory devices 132 may include any number of suitable memory devices, such as caches, read-only memory devices, random access memory devices, magnetic storage devices, etc. The memory devices 132 may store data, executable instructions, and/or various program modules utilized by the processor(s) 131. Examples of data that may be stored by the memory devices 132 include data files 137, voice sample data 138, and/or any number of suitable program modules that may be executed by the processor(s) 131, such as an operating system ("OS") 139, a programming module 140, and/or a passive detection module 141.

The data files 137 may include any suitable data that facilitates the operation of the customer premise device 105, the processing of a broadband signal, the detection and/or identification of one or more users, and/or the customization of programming content. For example, the data files 137 may include, but are not limited to, user profile information, user preferences and/or parameters associated with the customization of content, user log-in information associated with the access of user-specific content, information associated with one or more user devices 115 (e.g., device identification information, etc.), information that facilitates processing of broadband content, and/or information that facilitates the presentation of broadband content.

The voice sample data 138 may include any number of stored voice samples associated with one or more users of the customer premise device 105. Additionally, in certain embodiments, the voice sample data 138 may include pre-stored generic voice sample data that may be utilized to identify characteristics of a user, such as a likely user gender, a likely user age range, and/or other characteristics. In certain embodiments, a user may direct the customer premise device 105 to store a digital voice sample during the initialization and/or setup of a programming customization feature and/or profile. For example, during an initialization process, a user may be prompted to speak, and the user's voice may be captured by the audio capture devices 133. The captured voice data may be converted into digital data by one or more suitable analog-to-digital converters, and at least a portion of the digital voice sample may be stored as voice sample data 138. As desired, voice samples may be stored in a relatively secured fashion. The stored voice sample data 138 may be utilized in a subsequent passive detection and/or identification of the user.

The OS 139 may be a suitable software module that controls the general operation of the customer premise device 105. The OS 139 may also facilitate the execution of other software modules, for example, the programming module 140 and/or the passive detection module 141. The programming module 140 may be a suitable software module that facilitates the processing and/or output of broadband content. For example, the programming module 140 may be configured to format at least a portion of a received broadband signal for output by the customer premise device 105 and presentation via one or more display devices 110. A wide variety of broadband content may be formatted for output by the programming module 140 as desired in various embodiments of the invention, including but not limited to, television content, audio content, VoIP telephone content, electronic program guide data, Internet and/or Web site content, etc. Additionally, the programming module 140 may be configured to receive and process user commands associated with the output of broadband content. For example, the programming module 140 may be configured to process user commands received via remote control input and/or user voice commands.

The passive detection module 141 may be a suitable software module that facilitates the passive detection of one or more users of the customer premise device 105. A wide variety of suitable methods and/or techniques may be utilized as desired to detect and/or identify one or more users. Additionally, as desired, a combination of detection techniques may be utilized. One example of a suitable detection technique involves the detection of voice data proximate to the customer premise device 105, and the identification of one or more registered and/or unregistered users based upon the detected voice data. Another example of a suitable detection technique involves the detection of one or more user devices 115 proximate to the customer premise device 105. As shown in FIG. 1, the passive detection module 141 may include a voice recognition module 142 and/or a device recognition module 143. These module 142, 143, either individually or in combination, may facilitate the identification and/or detection of one or more users of the customer premise device 105.

The voice recognition module 142 may be a suitable software module that facilitates the processing of received audio content and the detection and/or identification of one or more users of the customer premise device 105 based upon the received audio content. In operation, the voice recognition module 142 may receive a collected sample of ambient audio, and the voice recognition module 142 may process the collected sample in order to detect and/or identify one or more users of the customer premise device 105. For example, the voice recognition module 142 may periodically (e.g., once a minute, once every ten minutes, etc.) receive a sample of ambient audio that is collected by an audio capture device 133 and converted into digital data. As an addition to or as an alternative to periodically receiving an audio sample, the voice recognition module 142 may receive an audio sample based upon the occurrence of a predefined event, such as the turning on of a display device 110, the receipt of a change of channel command, the receipt of a command to access an electronic program guide, etc.

Once an audio sample has been received, the voice recognition module 142 may compare at least a portion of the audio sample to one or more stored voice samples. A wide variety of suitable voice recognition algorithms and/or techniques may be utilized as desired to facilitate a comparison and/or identification of one or more users. Based at least in part on the comparison, the voice recognition module 142 may identify one or more registered users of the customer premise device 105. A registered user may be identified based upon an identified match or correspondence between a collected audio sample and a stored voice sample. Additionally, in certain embodiments, the voice recognition module 142 may detect the presence of one or more unregistered users of the customer premise device 105. For example, an unregistered user may be detected based at least in part upon an identification of collected audio voice data that does not match or correspond to a stored voice sample for a registered user. In certain embodiments, one or more characteristics of an unregistered user may be identified. For example, a collected audio sample may be compared to one or more generic voice samples and, based at least in part upon the comparison, one or more user likely characteristics may be determined. As one example, a likely gender and/or a likely age range may be determined.

In certain embodiments of the invention, the voice recognition module 142 may filter audio that is output by a display device 110 from a collected audio sample. In this regard, the audio data that is compared to stored voice samples may be processed in an attempt to include only voice data associated with users of the customer premise device 105. A wide variety of processing techniques may be utilized as desired to programmatically remove and/or filter out collected audio data associated with the output of the customer premise device 105 and/or the display device 110. For example, the output of the customer premise device 105 at the time the audio sample is collected may be identified and/or stored in a suitable memory. Components of the collected audio sample that match the output of the customer premise device 105 may be removed and/or filtered out of the collected audio sample.

As desired, once one or more users are detected and/or identified based upon the analysis of collected audio data, the identities of the users may be verified based upon user device authentication, such as the user device authentication described below with reference to the device recognition module. One example of the operations that may be performed by the voice recognition module 142 is described in greater detail below with reference to FIG. 4.

The device recognition module 143 may be a suitable software module that facilitates the detection of one or more user devices 115, and the detection and/or identification of one or more users of the customer premise device 105 based upon the detected user devices 115. In operation, the device recognition module 143 may store information associated with one or more user devices 115, such as device identifiers and/or identifying information for users associated with the user devices. For example, information associated with user devices 115 may be stored during an initialization or setup process for the customization of programming content.

Following storage of user device data, one or more networks 150 may be polled in order to detect the presence of one or more user devices 115 in proximity to the customer premise device 105. A wide variety of different types of networks 150 may be polled as desired in various embodiments of the invention, such as a BLUETOOTH-enabled network, a WI-FI enabled network, a radio frequency network, a cellular network, etc. Polling of a network may involve, for example, periodic polling (e.g., once a minute, once every ten minutes, etc.) and/or polling based upon the detection of a predetermined event, such as the turning on of a display device 110, the receipt of a command to change a channel, the receipt of a command to access an electronic program guide, etc. As desired, one or more transceivers and/or communications interfaces 134 incorporated into the customer premise device 105 and/or in communication with the customer premise device 105 may facilitate the polling and/or the detection of one or more user devices 115. For example, a BLUETOOTH transceiver, a WI-FI transceiver, a radio frequency transceiver, and/or a femtocell may be incorporated into the customer premise device 105.

Based upon the polling of the one or more networks 150, one or more user devices 115 may be detected, and device identifiers associated with the detected user devices 115 may be received. Received device identifiers and/or other collected information may be compared to at least a portion of the stored device information. If a received device identifier is determined to match a stored device identifier, then a user associated with the device identifier may be determined and identified as a user of the customer premise device 105. In this regard, one or more registered users of the customer premise device 105 may be detected and identified. Additionally, based upon a determination that one or more received device identifiers fail to match the stored identifiers, the presence of one or more unregistered users of the customer premise device 105 may be identified.

As desired, once one or more users are detected and/or identified based upon the analysis of received device identifiers, the identities of the users may be verified based upon an analysis of collected audio data, such as the analysis described above with reference to the voice recognition module 142. One example of the operations that may be performed by the device recognition module 143 is described in greater detail below with reference to FIG. 5.

In certain embodiments of the invention, a plurality of different users may be detected by the passive detection module 141. For example, a plurality of registered users (e.g., a parent and a child within a household, etc.) of the customer premise device 105 may be detected and identified. As another example, at least one registered user and at least one unregistered user of the customer premise device 105 may be detected. As yet another example, one or more unregistered users may be detected and characteristics of the unregistered users may be determined. As desired, the customization of programming content may be based at least in part upon the detection of a plurality of users.

Once one or more users have been detected and/or identified, the passive detection module 141 may determine programming content to be output by the customer premise device 105 for presentation to the users. In certain embodiments of the invention, the passive detection module 141 may analyze user preference data included in one or more user profiles and/or programming history data in order to determine customized programming content. Additionally, as desired in certain embodiments, the passive detection module 141 may communicate user identity information to a programming system 155 associated with the broadband source 120 along with a request to provide customized programming content information. The customized programming content may be determined based at least in part upon a received response to the request. One example of the operations that may be performed in order to determine customized programming content is described in greater detail below with reference to FIG. 6.

A wide variety of different types of customized programming content may be determined as desired in various embodiments of the invention based upon the passive detection of one or more users. For example, recommendations for on demand content, pay-per-view content, and/or other television and/or audio content may be determined based upon the identification of one or more users and/or the determination of one or more user characteristics. As desired, different recommendations may be made for an identified single user as compared to an identified plurality of users (e.g., multiple members of a family). Programming recommendations may be displayed via a suitable electronic programming guide application and/or other suitable application associated with the customer premise device 105. As another example, a list of favorite channels may be determined based upon the identification of one or more users. As yet another example, targeted advertisements may be presented based upon the identification of one or more users. As yet another example, customized Internet content and/or Web sites (e.g., social networking sites, etc.) may be presented based upon the identification of one or more users. As desired, the customer premise device 105 may access Internet content, on demand content, and/or other content based upon the identities of one or more users and/or access information (e.g., user names, passwords, etc.) stored in one or more user profiles. Other types of customized content may be identified and output as desired in various embodiments of the invention. The content described above is provided by way of example only.

With continued reference to the customer premise device 105, the one or more audio capture devices 133 may include any suitable devices configured to collect a sample of ambient audio. For example, the audio capture devices 133 may include one or more microphones embedded into the customer premise device 105 and/or in communication with the customer premise device 105. In other words, a microphone may be an internal microphone or an external microphone. Similarly, the one or more transceivers 134 may include any suitable devices and/or communications interfaces configured to facilitate communications with one or more user devices 115 via any number of suitable local networks 150, such as a BLUETOOTH-enabled network, a radio frequency network, a WI-FI enabled network, a cellular network, and/or other wireless network. In this regard, one or more user devices 115 may be detected.

The one or more I/O interfaces 135 may facilitate communication between the customer premise device 105 and one or more input/output devices, for example, one or more user interface devices, such as a display, keypad, mouse, pointing device, control panel, touch screen display, remote control, microphone, speaker, etc., that facilitate user interaction with the customer premise device 105. In this regard, user commands may be received by the customer premise device 105.

The one or more broadband signal interfaces 136 may facilitate connection of the customer premise device 105 to one or more suitable service provider networks 125 or broadband networks, for example, a cable network or a satellite network. In this regard, the customer premise device 105 may receive a broadband signal for processing and output. Additionally, the customer premise device 105 may communicate commands and/or requests to a broadband source 120, and the customer premise device 105 may receive commands and/or information from the broadband source.

With continued reference to FIG. 1, the display device 110 may be any suitable device configured to receive content output by the customer premise device 105 and to present at least a portion of the content to one or more users. Examples of suitable display devices 110 include, but are not limited to, televisions, monitors, and/or stereo systems.

Additionally, as desired, any number of user devices 115 may be utilized as desired in various embodiments of the invention. A user device 115 may be configured to interact with the customer premise device 105 via one or more local networks (e.g., a BLUETOOTH-enabled network, WI-FI enabled network, etc.). Once communication is established with the customer premise device 105, the user device 115 may transmit or otherwise communicate a device identifier and/or other device information to the customer premise device 105. In this regard, a user associated with the user device 115 may be identified. A wide variety of different types of user devices 115 may be utilized as desired, such as mobile devices, etc.

The broadband source 120 may include any number of systems and/or devices that facilitate the output of a broadband signal for receipt by any number of customer premise devices. For example, the broadband source 120 may include systems associated with a cable service provider, satellite service provider, or other service provider. In operation, the broadband source 120 may receive content from one or more content providers, format content for output in a broadband signal, and/or output the broadband signal. Examples of suitable systems that may be associated with the broadband source include, but are not limited to, a service provider head-end component, a conditional access system controller, any number of encryption devices, an electronic program guide data server, an on demand server, a pay-per-view purchase server, etc.

In certain embodiments, the broadband source 120 may include a programming system 155 that is configured to, identify customized programming content and/or suggestions for programming content to be communicated to the customer premise device 105. In operation, a programming system 155 may receive a request for customized programming content along with an identity of one or more users. Based upon the received user identities, the programming system 155 may determine customized programming content and direct the communication of information associated with the customized programming content to the requesting customer premise device 105. One example programming system 155 is described in greater detail below with reference to FIG. 2.

Communications between various components of the system 100 may be facilitated via any number of suitable networks, such as one or more service provider networks 125 (e.g., a cable network, a satellite network, etc.). The service provider networks 125 may include any telecommunication and/or data networks, whether public, private, or a combination thereof, including but not limited to, a local area network, a wide area network, an intranet, the Internet, public switched telephone networks, satellite networks, cable networks, and/or any combination thereof and may be wired and/or wireless.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1.

Figure 2:
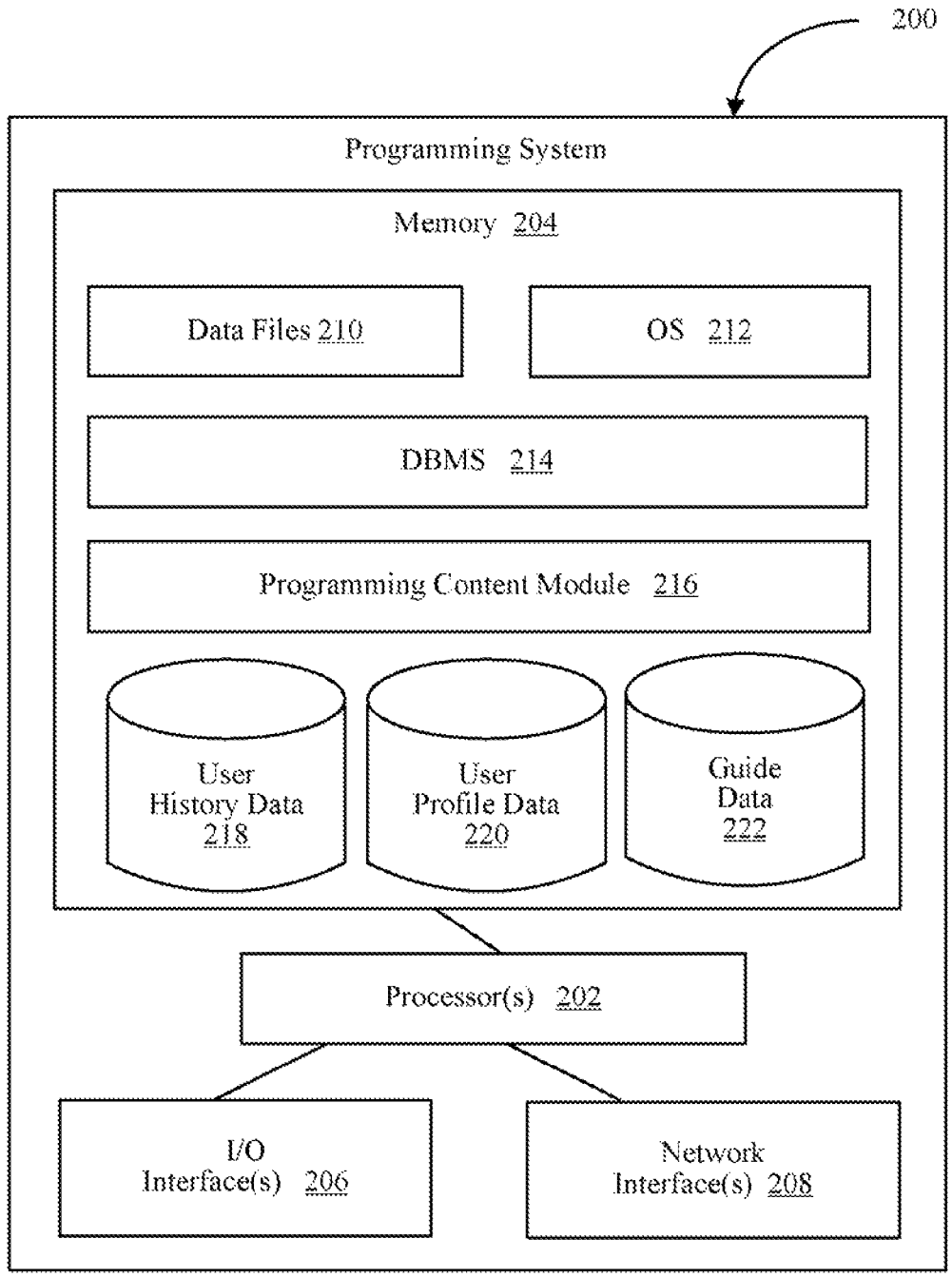
FIG. 2 illustrates a block diagram of the example components of a programming system, according to an illustrative embodiment of the invention.

FIG. 2 illustrates a block diagram of the example components of a programming system 200, such as the programming system 155 illustrated in FIG. 1. The programming system 200 may be a suitable processor-driven device configured to receive user identification information and/or user characteristic information (e.g., a likely user gender, a likely user age range, etc.) from a customer premise device, such as the customer premise device 105 illustrated in FIG. 1, and determine, based at least in part on the received user information, customized programming content information for the one or more users associated with the customer premise device 105. Examples of suitable processor-driven devices that may be utilized as a programming system 200 include, but are not limited to, a personal computer, a digital assistant, a personal digital assistant, a digital tablet, an Internet appliance, an application-specific circuit, a microcontroller, a minicomputer, or any other processor-based device. The execution of suitable computer-implemented instructions or computer-executable instructions by the programming system 200 may form a special purpose computer or other particular machine that is operable to facilitate the identification of customized programming content for one or more users associated with customer premise devices 105.

With reference to FIG. 2, the programming system 200 may include one or more processors 202, one or more memory devices 204, one or more input/output ("I/O") interfaces 206, and/or one or more network interfaces 208. The processor(s) 202 may be configured to execute any number of software applications and/or computer-readable or computer-executable instructions. The memory devices 204 may include any number of suitable memory devices, such as caches, read-only memory devices, random access memory devices, magnetic storage devices, etc. The memory devices 204 may store data, executable instructions, and/or various program modules utilized by the processor(s) 202. Examples of data that may be stored by the memory devices 204 include data files 210 and/or any number of suitable databases. Additionally, the memory devices 204 may be configured to store any number of suitable program modules that may be executed by the processor(s) 202, such as an operating system ("OS") 212, a database management system ("DBMS") 214, and/or a programming content module 216.

The data files 210 may include any suitable data that facilitates the operation of the programming system 200, the receipt of customized content requests, and/or the processing of customized content requests. For example, the data files 210 may include, but are not limited to, information that facilitates communication with any number of customer premise devices 105 and/or information that facilitates the generation of customized programming content information. The databases may include, for example, a user history database 218, a user profile database 220, and/or a guide data database 222. The user history database 218 may include historical information associated with previous content that has been viewed and/or purchased by one or more users, such as previous on demand content and/or pay-per-view content. The user profile database 220 may include a wide variety of user preferences and/or parameters associated with the determination of customized programming content. The guide data database 222 may include electronic program guide information associated with available content that may be suggested and/or presented to a user as customized content.

The OS 212 may be a suitable software module that controls the general operation of the programming system 200. The OS 212 also facilitates the execution of other software modules, for example, the DBMS 214 and/or the programming content module 216. The DBMS 214 may facilitate the management and/or access of information included in the one or more databases 218, 220, 222. As desired, the programming system 200 may additionally include one or more host modules that facilitate the establishment of a communications session with one or more customer premise devices 105. In this regard, the programming system 200 may receive one or more requests for customized content.

The programming content module 216 may be a suitable software module or software application that is configured to receive and process customized content requests. In operation, the programming content module 216 may receive a request for customized programming content from a customer premise device 105. The programming content module 216 may identify one or more registered or identified users associated with the request. Additionally, in certain embodiments, the programming content module 216 may determine that one or more unregistered users are associated with the request and, as desired, the programming content module 216 may identify one or more characteristics (e.g., gender, age, etc.) associated with the unregistered users. As desired, the programming content module 216 may additionally identify one or more user preferences and/or parameters included in a request, such as a user preference communicated to the programming system 200 by a customer premise device 105.

Once a request has been received and information associated with the request has been identified, the programming content module 216 may obtain user profile information and/or user history information from the user profile database 220 and/or the user history database 218. In this regard, the programming content module 216 may identify information associated with previous content viewed and/or purchased by one or more users and/or previous content suggested to the users. Additionally, the programming content module 216 may identify stored user preferences and/or parameters associated with the identification of customized programming content. As desired, the programming content module 216 may additionally access electronic program guide data, such as data included in the guide data database 222, in order to determine available content that may be suggested to users. The programming content module 216 may then identify or determine customized programming content for suggestion and/or presentation to the users, and the programming content module 216 may communicate information associated with the customized programming content to the customer premise device 105 from which the request was received. One example of the operations that may be performed by the programming system 200 is described in greater detail below with reference to FIG. 6.

The one or more I/O interfaces 206 may facilitate communication between the programming system 200 and one or more input/output devices, for example, one or more user interface devices, such as a display, keypad, mouse, pointing device, control panel, touch screen display, remote control, microphone, speaker, etc., that facilitate user interaction with the programming system 200. In this regard, user commands may be received by the programming system 200.

The one or more network interfaces 208 may facilitate connection of the programming system 200 to one or more suitable networks, for example, a broadband network or service provider network (e.g., a cable network, satellite network, etc.), such as the service provider networks 125 illustrated in FIG. 1. In this regard, the programming system 200 may communicate with one or more customer premise devices 105, receive requests for customized programming content, and/or communicate information associated with customized programming content.

Those of ordinary skill in the art will appreciate that the components of the programming system 200 shown in and described with respect to FIG. 2 are provided by way of example only. Numerous other components and/or combinations of components may be utilized as desired for the programming system 200 in various embodiments of the invention.

Operational Overview

Figure 3:
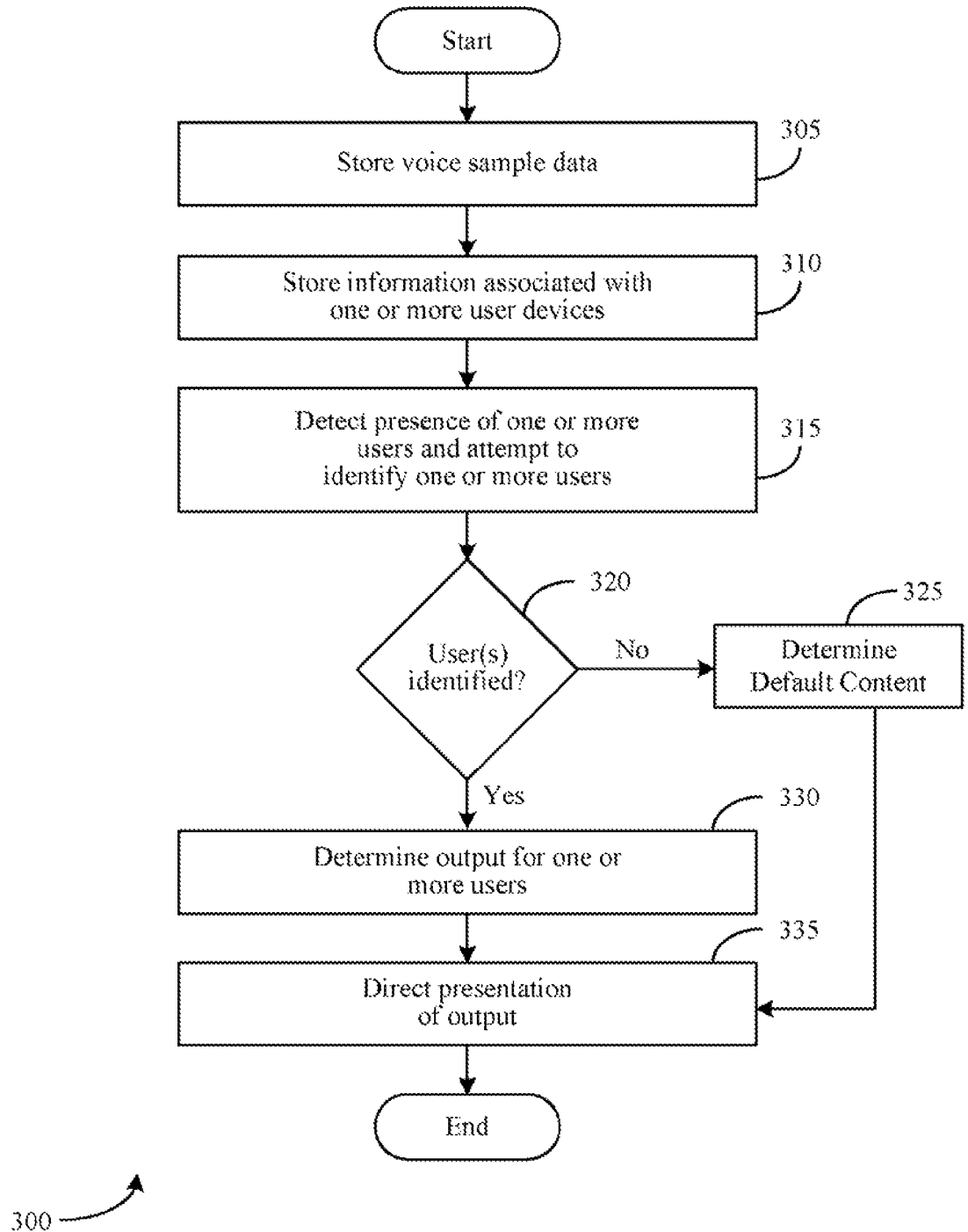
FIG. 3 is a flow diagram of an example method for facilitating the customization of broadband content, according to an example embodiment of the invention.

FIG. 3 is a flow diagram of an example method 300 for facilitating the customization of broadband content, according to an example embodiment of the invention. The method 300 may be performed by a suitable customer premise device, such as the customer premise device 105 illustrated in FIG. 1. The method 300 may begin at block 305.

At block 305, voice sample data for one or more users of the customer premise device 105 may be collected and stored. For example, during an initialization and/or updating of user preferences process associated with a feature or application that facilitates customization of content, one or more users may be prompted to record voice sample data. One or more phrases spoken by the user(s) may be captured by one or more suitable audio capture devices (e.g., microphones), and the captured voice samples may be digitized and stored in a suitable memory associated with the customer premise device 105, such as the memory 132 illustrated in FIG. 1. Additionally, a user identifier, such as an identifier entered or selected by the user utilizing a suitable input device (e.g., a remote control), may be stored in association with each stored voice sample. In certain embodiments, other voice sample data may also be stored by the customer premise device 105. For example, one or more generic voice samples may be prestored during a manufacturing and/or initialization process of the customer premise device 105.

At block 310, information associated with one or more user devices may be collected and stored. For example, information may be stored that is associated with mobile devices configured to communicate over one or more local area networks (e.g., BLUETOOTH-enabled networks, radio frequency networks, WI-FI enabled networks, cellular networks, etc.). In one example embodiment, device information may be stored during an initialization and/or updating of user preferences process associated with the content customization feature. For example, one or more users may be prompted to synchronize user devices with the customer premise device 105. During a synchronization process, a network connection may be established between a user device and the customer premise device 105, and the customer premise device may collect device information, such as a device identifier, from the user device. The device identifier and/or other device information may then be stored in a suitable memory 132. Additionally, a user identifier may be associated with each device identifier in a similar manner as that described above at block 305.

Following the initialization and/or setup of a content customization feature, the customer premise device 105 may passively detect one or more users, and the customer premise device 105 may customize content based at least in part upon the detection of the one or more users. At block 315, the customer premise device 105 may detect the presence of one or more users and, as desired, the customer premise device 105 may attempt to identify one or more of the users as registered users. A wide variety of suitable techniques may be utilized as desired to detect and/or identify users. For example, as explained in greater detail below with reference to FIG. 4, one or more users may be detected by the customer premise device 105 based upon the collection and analysis of one or more ambient audio samples. As another example, as explained in greater detail below with reference to FIG. 5, one or more users may be detected by the customer premise device 105 based upon the detection of one or more user devices in proximity to the customer premise device 105.

Following the detection of one or more users at block 315, operations may continue at block 320.

At block 320, a determination may be made as to whether one or more of the detected users are identified. In other words, a determination may be made as to whether a detected user has registered with the customer premise device 105 by storing user identification information at the customer premise device 105. Additionally, as desired, the customer premise device 105 may determine whether one or more characteristics associated with a detected user may be determined. For example, the customer premise device 105 may determine whether a likely gender and/or a likely age range for a detected user may be determined. If it is determined at block 320 that none of the detected users are identified and/or that no user characteristics are determined, then operations may continue at block 325. At block 325, the customer premise device 105 may determine that default programming content will be output for presentation to the detected users. In other words, customized content will not be output for the detected users. Operations may then continue at block 335.

If, however, it is determined at block 320 that one or more of the detected users have been identified and/or that one or more user characteristics have been determined, then operations may continue at block 330. At block 330, customized programming content may be determined or identified for the one or more users. In certain embodiments, the customized content may be identified based upon the identification of a single registered user. In other embodiments, the customized content may be identified based upon the identification of a plurality of registered users. In yet other embodiments, the customized content may be identified based upon the identification of one or more registered users and the detection of one or more unregistered users. In yet other embodiments, the customized content may be identified based upon one or more determined user characteristics. For example, a likely gender and/or age range for an unregistered user may be determined based at least in part upon comparing collected voice data to one or more generic voice samples, and content may be customized based upon the determined gender and/or age range.

Additionally, in certain embodiments, the customer premise device 105 may identify customized content. In other embodiments, the customer premise device 105 may communicate a request for customized content information to a suitable programming system associated with a source provider, such as the programming system 155 illustrated in FIG. 1. Customized content information may be returned to the customer premise device 105 in response to a request. One example of the operations that may be utilized to facilitate a determination of customized programming content is described in greater detail below with reference to FIG. 6. Following the determination of customized content, operations may continue at block 335.

At block 335, the customer premise device 105 may direct the presentation of the determined output or content, whether the determined content is default content or customized content. For example, the customer premise device 105 may provide content to one or more suitable display devices, such as the display devices 110 illustrated in FIG. 1, and the display devices 110 may present the content to the one or more users. A wide variety of content may be output for presentation by the customer premise device 105, such as television content, Internet content, on demand content, pay-per-view content, advertisements, electronic program guide content, etc.

The method 300 may end following block 335.

Figure 4:
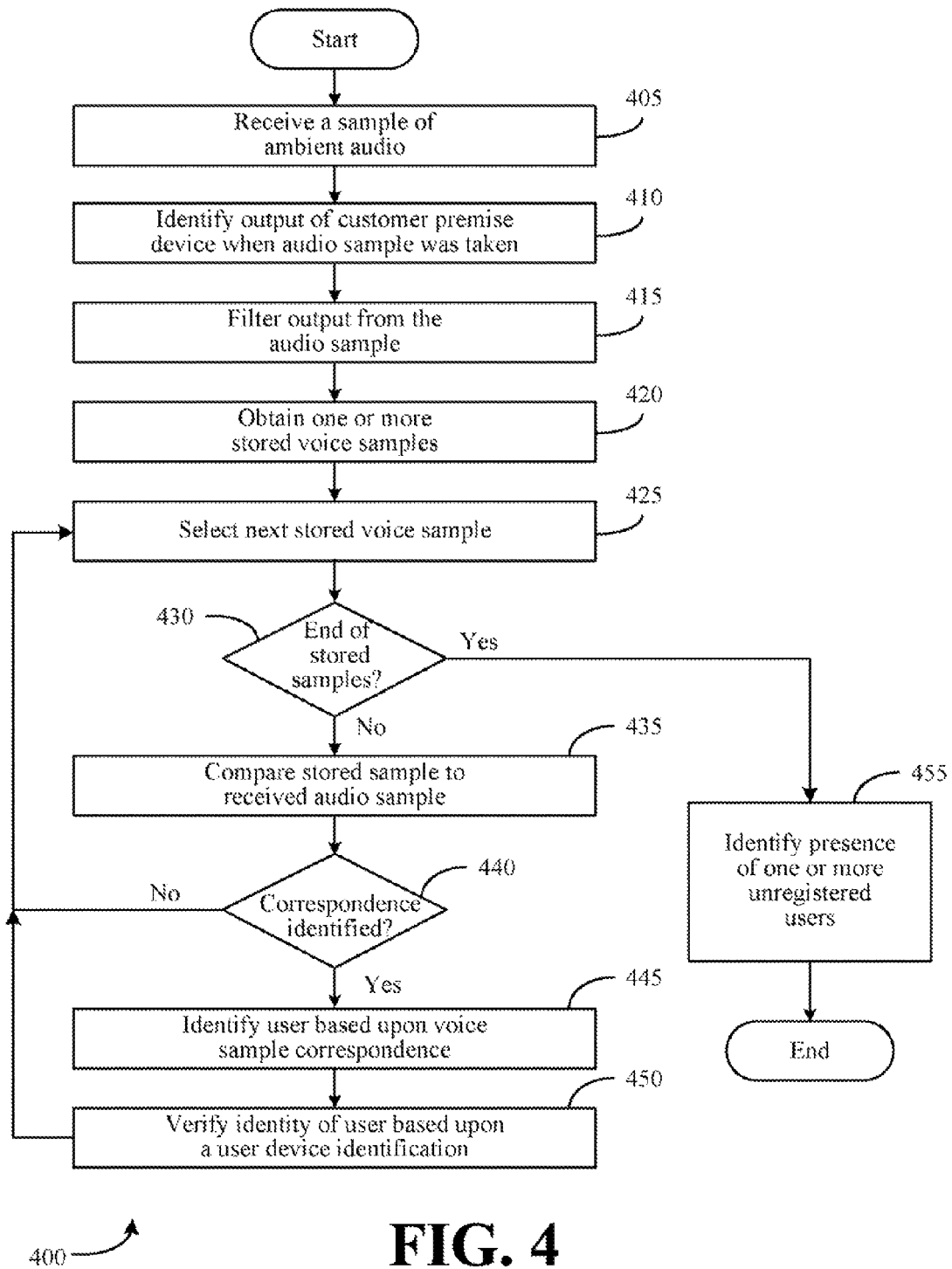
FIG. 4 is a flow diagram of an example method for detecting the presence of one or more users, according to an example embodiment of the invention.

FIG. 4 is a flow diagram of an example method 400 for detecting the presence of one or more users, according to an example embodiment of the invention. The method 400 may be one example of the operations that may be performed at block 315 of method 300. As such, the method 400 may be performed by a suitable customer premise device and/or voice recognition module, such as the customer premise device 105 and/or the voice recognition module 142 illustrated in FIG. 1. The method 400 may begin at block 405.

At block 405, a sample of ambient audio associated with the customer premise device 105 may be received. For example, one or more suitable audio capture devices (e.g., a microphone, etc.), such as the audio capture device 133 described, above with reference to FIG. 1, may be utilized to collect a sample of ambient audio. In certain embodiments, audio samples may be periodically collected and processed. For example, audio samples may be collected at predetermined time intervals (e.g., once every 10 minutes, once every 30 minutes, etc.). As another example, audio samples may be collected based upon the identification of a predetermined event, such as the access of an electronic program guide application. As desired, a collected audio sample may be processed through any number of analog-to-digital converters in order to convert the collected audio sample into digital data.

At block 410, an output of the customer premise device 105 at the time the audio sample is collected may be identified. For example, programming content output by the customer premise device 105 may be identified, and one or more audio components associated with the output programming content may be identified. In certain embodiments, the customer premise device 105 may include a suitable buffer or other memory device configured to store the audio output of the customer premise device 105 during the collection of an audio sample by the audio capture devices 133.

At block 415, the audio output of the customer premise device 105 may be programmatically filtered out of the collected audio sample. For example, one or more stored audio components associated with the output of the customer premise device 105 may be compared to the collected audio sample. Components of the collected audio sample that match or correspond to the audio output of the customer premise device 105 may be programmatically removed from the collected audio sample. In this regard, components of the collected audio sample that are likely associated with users of the customer premise device 105 may be isolated.

At block 420, one or more stored generic voice samples and/or one or more voice samples associated with one or more registered users of the customer premise device 105 may be accessed from memory. For example, one or more voice samples stored during an initialization process for a content customization application may be accessed from memory. According to an aspect of the invention, one or more of the accessed voice samples may be compared to the collected audio sample in an attempt to identify one or more users of the customer premise device 105 and/or in an attempt to identify one or more user characteristics (e.g., a likely gender and/or a likely age range of an unregistered user). For example, at block 425, a next stored audio sample may be identified and selected. At block 430, a determination may be made as to whether an end of the stored voice samples has been reached. If it is determined at block 430 that an end of the stored voice samples has been reached, then operations of the method 400 may either end or continue at block 455 described in greater detail below. If, however, it is determined at block 430 that an end of the stored voice samples has not been reached, then operations may continue at block 435.

At block 435, the selected voice sample may be compared to at least a portion of the collected audio sample. At block 440, a determination may be made as to whether a correspondence exists between the selected voice sample and the collected audio sample. A wide variety of suitable voice recognition algorithms and/or techniques may be utilized as desired to determine whether a correspondence exists. If no correspondence is identified at block 440, then operations may continue at block 425, and a next stored voice sample may be selected for processing and comparison. If, however, a correspondence is identified at block 440, then operations may continue at block 445.

At block 445, a user of the customer premise device 105 may be identified based upon a determined correspondence between the collected audio sample and the selected voice sample. Additionally or alternatively, one or more user characteristics, such as a likely gender and/or a likely age range, may be determined based upon a determined correspondence between the collected audio sample and the selected voice sample. As one example, in the event the selected audio sample is a generic audio sample, one or more characteristics associated with the audio sample (e.g., a gender, an age range, etc.) may be identified as likely characteristics of a user. As another example, in the event the selected audio sample is a voice sample for a registered user, a user identity or user identifier associated with the selected voice sample may be determined. In this regard, a registered user of the customer premise device 105 may be determined based upon the collected audio sample. Additionally, as desired in certain embodiments of the invention, one or more other user identification techniques may be utilized in order to verify the identity of the user. For example, at block 450, the identity of the user may be verified based upon a user device identification. One example of a user identification based upon user device identification is described in greater detail below with reference to FIG. 5. Operations may then continue at block 425, and a next stored voice sample may be selected for processing. In this regard, a plurality of registered users may be identified.

In certain embodiments, a user may be prompted to verify their identity and/or to register with the customer premise device. For example, a user may be requested to verify their identity in the event that the user cannot be passively detected and identified. As another example, a user may be prompted to enter registration data and/or to record an audio sample.

Additionally, as desired in certain embodiments, a determination may be made as to whether one or more users of the customer premise device 105 are identified as unregistered users of the customer premise device 105. For example, at block 455, the presence of one or more unregistered users of the customer premise device 105 may be identified. In one example embodiment, a determination may be made as to whether at least a portion of the collected audio sample includes voice data that does not correspond to one or more stored voice samples for registered users. In this regard, a situation in which only unregistered users are utilizing the customer premise device 105 may be identified. Additionally, a situation in which both one or more registered users and at least one unregistered user are utilizing the customer premise device 105 may be identified. As desired, one or more characteristics for unregistered users may be identified. For example, a likely gender and/or likely age range may be determined for an unregistered user based upon a comparison of a collected audio sample to one or more stored generic voice samples. Operations may end following block 455.

The method 400 may end following block 455.

Figure 5:
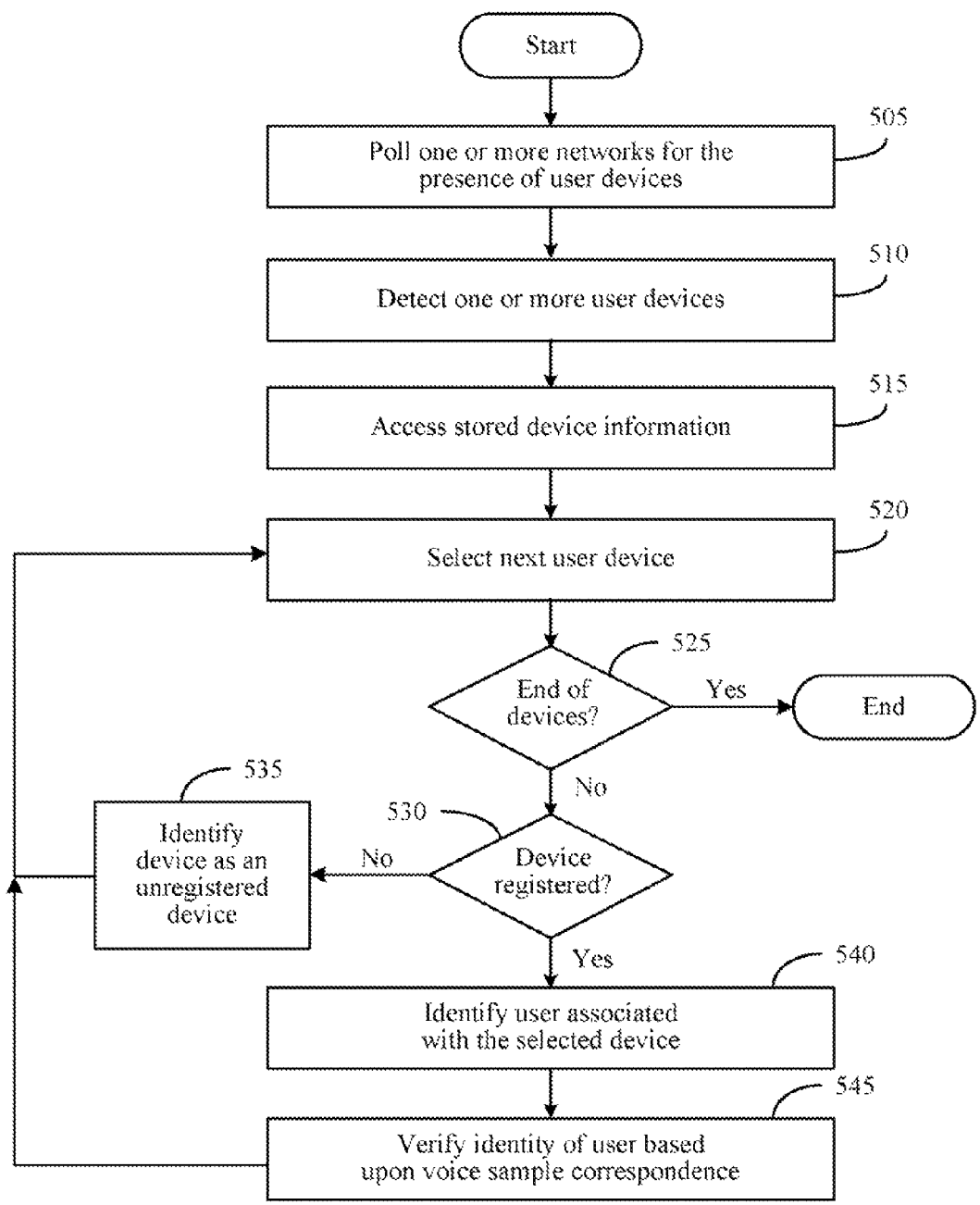
FIG. 5 is a flow diagram of another example method for detecting the presence of one or more users, according to an example embodiment of the invention.

FIG. 5 is a flow diagram of another example method 500 for detecting the presence of one or more users, according to an example embodiment of the invention. The method 500 may be one example of the operations that may be performed at block 315 of method 300. As such, the method 500 may be performed by a suitable customer premise device and/or voice recognition module, such as the customer premise device 105 and/or the voice recognition module 142 illustrated in FIG. 1. The method 500 may begin at block 505.

At block 505, one or more networks associated with the customer premise device 105 may be polled for the presence of one or more user devices. For example, one or more suitable transceivers and/or other devices (e.g., a femtocell, etc.) associated with the customer premise device 105 may be utilized to poll any number of local area networks associated with the customer premise device 105, such as a BLUETOOTH-enabled network, a WI-FI enabled network, a radio frequency network, or a cellular network. In this regard, the presence of one or more user devices, such as mobile devices in relatively close proximity to the customer premise device 105 may be detected at block 510.

When a device is detected, a wide variety of device information may be communicated from the detected device to the customer premise device 105 as desired in various embodiments of the invention, such as a device identifier and/or location information associated with the device. In certain embodiments, the location information (e.g., global positioning system coordinates) may be utilized to identify devices that are within relatively close proximity to the customer premise device 105 and/or to filter out devices that are not within a relatively close proximity or predetermined range. Additionally, in certain embodiments, a range between the customer premise device 105 and a detected device may be determined based upon location information, network connectivity and/or signal strength data, and/or other data. Devices that are outside of a predetermined range, such as a default range associated with a content customization application or a user-defined range, may be filtered out of the collected device data.

At block 515, stored device information associated with registered user devices may be accessed from memory. For example, device information stored during an initialization process of a content customization program may be accessed from a memory associated with the customer premise device 105. According to an aspect of the invention, at least a portion of the stored information may be compared to information received from one or more detected user devices in order to identify one or more registered and/or unregistered users of the customer premise device 105.

Any number of user devices may be detected by the customer premise device 105 as desired in various embodiments of the invention. At block 520, a next detected user device may be selected for processing. At block 525, a determination may be made as to whether an end of the detected user devices has been reached. If it is determined at block 525 that an end of the detected user devices has been reached, then operations of the method 500 may end. If, however, it is determined at block 525 that an end of the detected user devices has not been reached, then operations may continue at block 530.

At block 530, a determination may be made as to whether the selected user device is a device that has been registered with the customer premise device 105. For example, a determination may be made as to whether a received device identifier associated with the selected device matches a stored device identifier accessed from memory. If it is determined at block 530 that the selected user device is not a registered device, then operations may continue at block 535, and the user device may be identified as an unregistered device. In certain embodiments, the identification of an unregistered device may be utilized in an identification of one or more unregistered users of the customer premise device 105. As desired, the presence of an unregistered user may be identified based upon the detection of an unregistered user device in combination with the detection of audio data that does not correspond to stored voice sample data. Following block 535, operations may continue at block 520, and a next user device may be selected for processing.

If, however, it is determined at block 530 that the selected user device is a registered user device, then operations may continue at block 540. At block 540, a user of the customer premise device 105 may be identified based upon the identification of a registered user device. For example, a user identity or user identifier associated with the identified registered user device may be determined. In this regard, a registered user of the customer premise device 105 may be determined based upon the identification of a user device. Additionally, as desired in certain embodiments of the invention, one or more other user identification techniques may be utilized in order to verify the identity of the user. For example, at block 545, the identity of the user may be verified based upon a determined voice sample correspondence. One example of user identification based upon voice sample correspondence is described in greater detail above with reference to FIG. 4. Operations may then continue at block 520, and a next detected user device may be selected for processing. In this regard, a plurality of registered users may be identified.

The method 500 may end following block 525.

Figure 6:
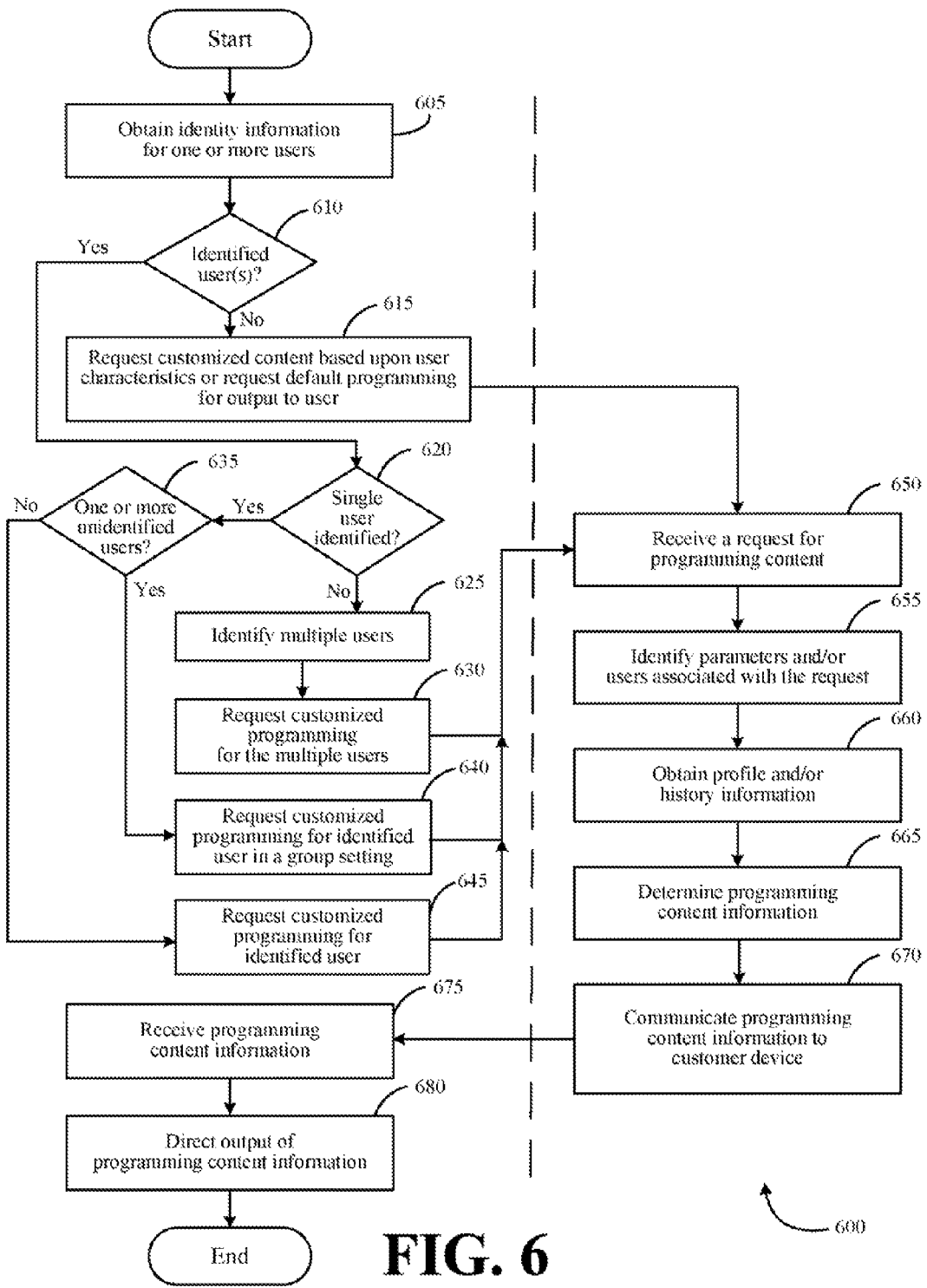
FIG. 6 is a flow diagram of an example method for determining customized content to be presented via a customer premise device, according to an example embodiment of the invention.

FIG. 6 is a flow diagram of an example method 600 for determining customized content to be presented via a customer premise device, according to an example embodiment of the invention. The method 600 may be one example of the operations that may be performed at block 330 of method 300. As such, the method 600 may be performed by a suitable customer premise device and/or passive detection module, such as the customer premise device 105 and/or the passive detection module 141 illustrated in FIG. 1. Additionally, certain operations of the method 600 may be performed by a suitable programming system, such as the programming system 155 illustrated in FIG. 1 or the programming system 200 illustrated in FIG. 2. The method 600 may begin at block 605.

At block 605, identity information for one or more users of the customer premise device 105 may be obtained, determined, and/or identified. Additionally, one or more characteristics or parameters for one or more users may be obtained, determined, and/or identified. For example, the presence of one or more registered and/or unregistered users of the customer premise device 105 may be determined. A wide variety of suitable methods and/or techniques may be utilized as desired in order to identify one or more registered users and/or to detect the presence of one or more unidentified or unregistered users, such as the audio detection technique described above with reference to FIG. 4 and/or the user device identification technique described above with reference to FIG. 5.

At block 610, a determination may be made as to whether any registered users of the customer premise device 105 have been passively detected and identified. If it is determined at block 610 that no registered users have been identified, then operations may continue at block 615. At block 615, a determination may be made that default programming content should be output by the customer premise device 105 for presentation to the user. In certain embodiments, a request for default programming content may be communicated to the programming system 200, and operations may continue at block 650 described in greater detail below. In other embodiments, the customer premise device 105 may determine or identify default programming content, and the customer premise device 105 may output the default programming content for presentation to the one or more users of the customer premise device 105.

As an alternative to determining that default programming content should be output, one or more likely characteristics of the user may be utilized to customize programming content. For example, a likely gender and/or age range may be determined for a detected user. Customized programming content may then be requested based upon the determined likely characteristics. For example, customized content may be requested for a female adult viewer. As another example, customized content may be requested for a male child. As yet another example, customized content may be requested for a male adult viewer and a female child. Indeed, a wide variety of different customization requests may be made based upon determined likely user characteristics.

If, however, it is determined at block 610 that at least one registered user has been identified, then operations may continue at block 620. At block 620, a determination may be made as to whether a single registered user has been identified. If it is determined at block 620 that a single registered user has been identified, then operations may continue at block 635 described in greater detail below. If, however, it is determined at block 620 that a single registered user is not identified, then operations may continue at block 625, and a plurality of registered users of the customer premise device 105 may be identified. Operations may then continue at block 630.

At block 630, programming content may be customized based upon the identities of the plurality of users. For example, if a registered parent and a registered child are identified, then customized family programming content may be suggested and/or output for presentation. In certain embodiments, the customer premise device 105 may communicate a request to the programming system 200 for customized programming content for the plurality of registered users, and operations may continue at block 650 described in greater detail below. The request may include identifying information for the registered users. Customized programming content may then be received in response to the request. As desired in certain embodiments, a determination may also be made as to whether the presence of one or more unregistered users has been detected as described in greater detail below with reference to block 635. Accordingly, programming content may be customized based upon an identification of a plurality of registered users and a detection of at least one unregistered user.

At block 635, it may be determined that a single registered user has been identified. A determination may then be made as to whether the presence of one or more unregistered users of the customer premise device 105 has been detected. If it is determined at block 635 that one or more unregistered users have been detected, then operations may continue at block 640. At block 640, programming content may be customized based upon the identification of a registered user and one or more unregistered users. In certain embodiments, a request for customized programming content may be communicated to the programming system 200, and operations may continue at block 650 described in greater detail below. The request may include identifying information for the registered user and an indication that at least one unregistered user has been detected. Customized programming content may subsequently be received by the customer premise device 105 in response to the communicated request.

If, however, it is determined at block 635 that one or more unregistered users have not been detected, then operations may continue at block 645. At block 645, programming content may be customized for the identified registered user. For example, Internet content, social networking data, channel preferences, and/or programming recommendations may be customized for the identified registered user. As desired in certain embodiments, a request for customized programming content may be communicated to the programming system 200, and operations may continue at block 650 described in greater detail below. The request may include identifying information for the registered user. Customized programming content may subsequently be received by the customer premise device 105 in response to the communicated request.

At block 650, a request for programming content may be received by the programming system 200. A wide variety of different types of requests for programming content may be received as desired in various embodiments of the invention. For example, a request for customized programming content may be received. As another example, a request for default programming content may be received. Additionally, in certain embodiments, one or more user identifiers, an indication of detected unregistered users, and/or determined characteristics (e.g., likely gender, likely age range, etc.) for unregistered users may be received in association with a request for programming content. At block 655, one or more parameters and/or users associated with the received request may be identified and/or determined by the programming system 200. For example, one or more registered users may be identified by the programming system 200 based upon data included in the received request. Additionally, the presence of one or more unregistered users and/or likely user characteristics may be identified based upon information included in the received request.

At block 660, which may be optional in certain embodiments of the invention, user profile and/or user history information for one or more identified registered users may be obtained or accessed from memory. A wide variety of user profile information may be accessed as desired, including but not limited to, user preferences for customizing programming content, user preferences for customizing content when various combinations of registered users are identified, user preferences for customizing content when the presence of unregistered users is identified in association with the user, content access data (e.g., passwords) associated with the user, a list of favorite channels, etc. Additionally, history information associated with previous content accessed, purchased, and/or viewed by the registered users may be accessed.

At block 665, programming content information may be determined by the programming system 200. In certain embodiments, such as embodiments in which no registered users have been identified, the determined programming content information may be default programming content. In other embodiments, the determined content may be customized programming content based upon the identities of one or more registered users. In yet other embodiments, the determined content may be customized program content based upon one or more user characteristics. As desired, user profile information and/or history information, as well as the presence of one or more unregistered users, may be taken into consideration when identifying customized programming content.

A wide variety of different types of programming content may be determined as desired in various embodiments of the invention, such as television programming content, recommended pay-per-view content, recommended on demand content, Internet content, electronic program guide application content, advertising content, etc. Once the programming content has been determined by the programming system 200, operations may continue at block 670, and programming content information may be communicated to the customer premise device 105 in response to the received request.

At block 675, the programming content information may be received by the customer premise device 105. The received programming content information may be processed by the customer premise device 105 at block 680, and the customer premise device 105 may utilize the received programming content information to identify content to be output to the users. For example, the customer premise device 105 may identify or determine default content or customized content to be output. At block 680, the customer premise device 105 may direct the output of programming content to one or more users. For example, the customer premise device 105 may output programming content for presentation via any number of suitable display devices, such as a television in communication with the customer premise device 105.

Additionally, as desired, various content access data, such as user names and/or passwords, may be accessed from user profiles based upon the identification of one or more registered users. The content access data may be utilized by the programming system 200 in order to access a wide variety of content on behalf of one or more registered users, such as secure Internet content, purchased pay-per-view content, and/or content protected by digital rights management techniques.

As an alternative to requested programming content from a programming system 200, a customer premise device 105 may determine programming content and/or customized content in a similar manner as that described above for the programming system 200 at blocks 655-665.

The method 600 may end following block 680.

The operations described and shown in the methods 300, 400, 500, and 600 of FIGS. 3-6 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 3-6 may be performed.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
   an audio capture device configured to collect a sample of ambient audio;
   at least one communications interface associated with a customer premise device and configured to passively detect one or more users in proximity to the customer premise device; and
   at least one processor associated with the customer premise device, the at least one processor configured to:
   (i) receive, from the at least one communications interface, a respective identifier of one or more respective user devices associated with a first detected user and a second detected user of the one or more users,
   (ii) determine, based at least in part on the received identifiers, an identity of the first detected user,
   (iii) receive the collected sample of ambient audio from the audio capture device,
   (iv) process the sample of ambient audio, wherein the processing comprises determining a first voice sample associated with the first detected user and a second voice sample associated with the second detected user,
   (v) compare the first voice sample and the second voice sample to one or more stored voice samples,
   (vi) determine, based at least in part on the comparison, that the first detected user is a registered user and the second detected user is an unregistered user,
   (vii) determine one or more first characteristics associated with the registered user and one or more second characteristics associated with the unregistered user, wherein determining the one or more second characteristics comprises:

determining that the second voice sample associated with the unregistered user does not match the one or more stored voice samples, and determining that the second voice sample associated with the unregistered user matches a generic stored voice sample associated with the one or more second characteristics, and (viii) customize, based at least in part on the identity of the registered user, the one or more first characteristics associated with the registered user, and the one or more second characteristics associated with the unregistered user, content that is output by the customer premise device.

2. The system of claim 1, wherein the at least one processor is further configured to remove, from the collected sample, one or more audio components associated with an output of the customer premise device, and wherein the remainder of the collected sample following the removal is compared to the one or more voice samples, the remainder comprising the first voice sample and the second voice sample.

3. The system of claim 1, wherein the audio capture device comprises at least one of (i) a microphone embedded into the customer premise device or (ii) a microphone in communication with the customer premise device.

4. The system of claim 1, wherein:
the identity comprises a first identity; and
the at least one processor is further configured to (i) determine a second respective identity of one or more third users and (ii) customize the content based at least in part on the identities of the first detected user and the one or more third users.

5. The system of claim 1, wherein the at least one processor is further configured to (i) communicate, based upon the identity of the first detected user, a request for programming content to a service provider, (ii) receive, from the service provider, customized content information, and (iii) customize the content that is output based upon the received customized content information.

6. The system of claim 1, wherein the one or more respective user devices comprise mobile devices.

7. The system of claim 1, wherein the at least one communications interface comprises at least one of (i) a BLUETOOTH transceiver, (ii) a WI-FI transceiver, (iii) a radio frequency transceiver, or (iv) a femtocell.

8. The system of claim 1, wherein the customer premise device comprises a television set-top box.

9. The system of claim 1, wherein the customized output comprises at least one of (i) a presentation associated with personalized channels for the first detected user, (ii) a targeted advertisement, (iii) a recommendation of on demand content, or (iv) a presentation associated with a social networking account for the first detected user.

10. A method comprising:
passively detecting, by a customer premise device configured to output programming content received from a service provider, one or more user devices in proximity to the customer premise device;
determining, by the customer premise device, a respective identifier of a first detected user device and a second detected user device of the one or more user devices;
collecting, by the customer premise device, a sample of ambient audio;
processing, by the customer premise device, the sample of ambient audio, wherein the processing comprises determining a first voice sample associated with the first detected user device and a second voice sample associated with the second detected user device;
determining, by the customer premise device based at least in part on the identifier of the first user device, an identity of a registered user associated with the first user device; and
determining, by the customer premise device, one or more first characteristics associated with the registered user at least in part by comparing the first voice sample to one or more stored voice samples;
determining, by the customer premise device, one or more second characteristics associated with an unregistered user associated with the second user device, wherein determining one or more second characteristics comprises:
determining that the second voice sample does not match the one or more stored voice samples; and
determining that the second voice sample matches a generic stored voice sample associated with the one or more second characteristics; and
customizing, based at least in part on the identity of the registered user, the one or more first characteristics associated with the registered user, and the one or more second characteristics associated with the unregistered user, content that is output by the customer premise device.

11. The method of claim 10, further comprising:
removing, from the collected sample by the customer premise device, one or more audio components associated with an output of the customer premise device,
wherein comparing the collected sample to one or more stored user voice samples comprises comparing the remainder of the collected sample following the removal, the remainder comprising the first voice sample and the second voice sample.

12. The method of claim 10, wherein collecting a sample of ambient audio comprises one of (i) collecting a sample utilizing a microphone embedded into the customer premise device or (ii) receiving a sample collected by a microphone in communication with the customer premise device.

13. The method of claim 10, wherein the identity of the registered user comprises a first identity, the method further comprising:
determining, by the customer premise device, a second respective identity of one or more third users,
wherein customizing the content comprises customizing the content based at least in part on the identities of the registered user and the one or more third users.

14. The method of claim 10, further comprising:
communicating, by the customer premise device to the service provider based upon the identity of the registered user, a request for programming content; and
receiving, by the customer premise device from the service provider, customized content information,
wherein customizing the content comprises customizing the content based upon the received customized content information.

15. The method of claim 10, wherein detecting a user device comprises detecting a mobile device.

16. The method of claim 10, wherein customizing the content comprises generating at least one of (i) a presentation associated with personalized channels for the registered user, (ii) a targeted advertisement, (iii) a recommendation of on demand content, or (iv) a presentation associated with a social networking account for the registered user.

* * * * *